United States Patent [19]

Dillard et al.

[11] 3,943,336

[45] Mar. 9, 1976

[54] PHOTOELECTRIC SCANNING SYSTEMS FOR READING DATA APPEARING IN AN ANGULAR FORMAT

[75] Inventors: John W. Dillard; Dominick Tringali, both of Columbia, S.C.

[73] Assignee: Universal Business Machines, Columbia, S.C.

[22] Filed: June 9, 1970

[21] Appl. No.: 44,740

[52] U.S. Cl....... 235/61.11 E; 235/61.12 N; 250/570
[51] Int. Cl.². G06K 7/10; G06K 19/06; G08C 9/06
[58] Field of Search......... 235/61.11 E; 250/219 ID, 250/219 D, 219 DD, 233, 227, 236

[56] References Cited
UNITED STATES PATENTS

| | | | |
|---|---|---|---|
| 3,412,256 | 11/1968 | Cronin | 250/233 |
| 3,474,234 | 10/1969 | Rieger et al. | 235/61.11 E |

*Primary Examiner*—Daryl W. Cook
*Attorney, Agent, or Firm*—Kemon, Palmer & Estabrook

[57] ABSTRACT

There is disclosed a photoelectric scanner head for reading information pertaining to actual time, elapsed time or the like from a card or other record-bearing member, and for providing output signals that are a function of the information read; the output signals are used to obtain a useable electrical analogue of the information read from the member. The scanner comprises a rotatably driven body member mounting a source of light, read photoelectric devices and a switching circuit for retrieving information from the record member. A source of signals is supported by the body member and operably connected to the photoelectric devices by the switching circuit such that the source generates scanner output signals as a function of the information retrieved. Scanner output signals are detected, and in most disclosed embodiments, are used to controllably gate timing pulses into counters such that the counters provide on their outputs a raw electrical analogue of the information read from the record member. Means may be connected to the counters for correcting the analogue to account for error in the recording made on the record member.

17 Claims, 15 Drawing Figures

JOHN W. DILLARD
DOMINICK TRINGALI,
INVENTORS

BY Kenyon, Palmer & Estabrook
ATTORNEYS

PHOTOELECTRIC SCANNING SYSTEMS FOR READING DATA APPEARING IN AN ANGULAR FORMAT

FIELD OF THE INVENTION

This invention relates to photoelectric scanners and scanner systems usable for the purpose of retrieving information based on time and particularly information based on actual time and on elapsed time from record-bearing members such as telephone toll cards or the like.

THE PRIOR ART

It has been the practice of the telephone operating companies, for at least sixty to seventy years, to have their operators manually record the connect and disconnect times of certain types of telephone calls, e.g., long distance person-to-person calls, collect calls, and the like. It has also been the practice of the said companies to have their employees visually read each recording to determine both the connect time; i.e., the time of day that the call was commenced and the elapsed time of the call in order that the charge for the call might be calculated.

These practices have continued up to the present time notwithstanding the fact that modern day technology has greatly automated many accounting procedures. In point of fact, modern telephone operating companies employ, so far as is possible, those techniques and machinery necessary for the rendering of computerized bills. Consequently, the manual functions mentioned must be characterized as an impedance to the automation of the billing process for the said companies. Indeed, the manual functions mentioned not only represent an impedance, they also represent a costly expense in both man (woman) hours and actual funds expended.

The problem, as above defined, has been recognized in part; see U.S. Pat. No. 3,031,135, to Dimond et al, assigned to Bell Telephone Laboratories, Inc. The apparatus disclosed in the patent is said to be useful for converting elapsed time recordings into an uncorrected electrical analogue. It apparently has been deficient in that telephone operating companies still employ the manual processes described above. It is noted that the apparatus taught in the patent does require the use of a flying spot scanner and its associated circuitry and supporting structure. Accordingly, it can be concluded that the apparatus is expensive and bulky. Further, the said apparatus requires electro-optical components that must be precisely aligned in order for the apparatus to function properly, and accordingly, the rate of error for the apparatus appears to be prohibitively high.

SUMMARY OF THE INVENTION

It is the principal object of this invention to provide a new, useful, accurate and automatic apparatus for photoelectrically converting perceptible information pertaining to time into electrically usable analogues.

It is an object of this invention to provide a novel rotatable photoelectric scanning head that is capable of automatically and accurately reading records of actual or elapsed time to generate useful output signals as functions of the recordings.

It is an object of this invention to provide a self-contained and rotatable photoelectric scanner that is capable of illuminating a recording of time, photoelectrically reading the recording, and generating an output signal having a duration proportional to the time read.

It is an object of this invention to provide a photoelectric system capable of generating pulses of radiation as functions of perceivable time recordings, and capable of utilizing the pulses to control the operation of one or more counters such that the output of the counter or counters is an electrical analogue of the recorded information.

It is an object of this invention to provide a photoelectric system having a rotatable scanner head for generating signals from perceivable recordings of units of time, and having signal detector means responsive to said signals for controllably entering timing pulses into one or more counters.

It is an additional object of this invention to provide a photoelectric system for reading recordings of time so as to produce electrical analogues of the recordings and having means for determining whether significant errors were introduced into the recordings by the means used to make the recordings and for eliminating such errors from the electrical analogue.

It is an additional object of this invention to provide a rotatable photoelectric scanner mounting a source of visible light and mounting a signal generator upon an axis of revolution of the scanner; the light source being operable to illuminate a printed recording of time, and the generator being switched on and off by a photoelectric circuit responsive to light reflected from the recording.

It is the further object of this invention to provide a novel structure for supporting a photoelectric system for rotation and capable of supplying electric power from supply circuits external of the structure to the photoelectric system.

These and other objects of the invention will become more readily apparent from the following description of illustrative embodiments of the invention when read with reference to the accompanying drawings in which:

DESCRIPTION OF PREFERRED EMBODIMENT

The Time and Elapsed Time Record

Figure 1:
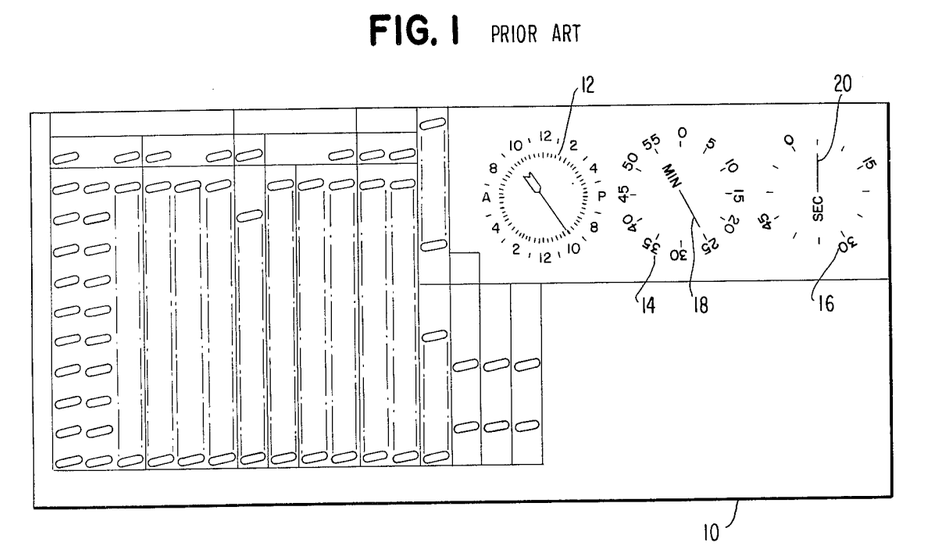
FIG. 1 is a representation of one side of a toll card of the prior art having printed recordings of the time of day at which a telephone call was placed and having printed recordings of the duration of the call in elapsed minutes and seconds.

In order to understand the operation of the scanning head in each of its preferred embodiments and of the system, a brief description of a conventional record member and of that member as modified, in order that it may be utilized with the apparatus of this invention, will be given with respect to FIGS. 1 and 2 of the drawings. A telephone toll card 10 having recordings thereon as made by a "Calculagraph" (a registered trademark of the Calculagraph Company, Harrison, New Jersey) is generally represented by FIG. 1. The card is inserted into the "Calculagraph" and when connection is made, e.g., a long distance person-to-person call is started, the operator depresses a first lever causing the recorder to print the connect time 12 (time of day) of the call, a minutes clock dial 14, and a seconds clock dial 16. In the Calculagraphs that are presently in general use, the printing head carrying the type face used to produce the minutes dial rotates at a constant minutes rate. A second head carrying an elapsed minutes type face is located concentrically within and locked to the dial face head for rotation therewith. Each head is movable relative to the other for printing purposes. Similarly, a second pair of heads rotate at a seconds rate and are separately operable to produce a dial 16 and an elapsed seconds recording. When a call is completed (disconnect), the card 10 is reinserted in the recorder and the operator depresses a second lever. Operation of the second lever effects an engagement of the elapsed time type faces with the card 10 such that an elapsed minutes pointer 18 and the abbreviation MIN is printed within the dial 14, and an elapsed seconds pointer 20 and the abbreviation SEC is printed within the dial 16. As shown in FIG. 1, the connect time was 10:25 AM, and disconnect occurred 25 minutes and 5 seconds later.

Figure 2A:
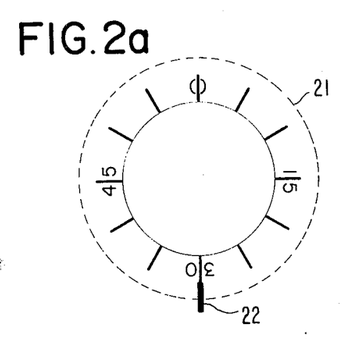
FIG. 2a is a representation of the start portion of a machine readable elapsed time recording employed on record members usable with the apparatus of the invention.
Figure 2B:
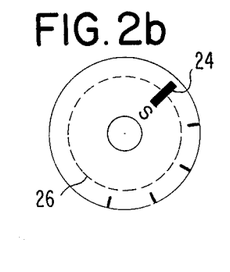
FIG. 2b is a representation of the stop portion of a machine readable elapsed time recording employed on record members usable with the apparatus of the invention.

To facilitate the process of machine reading, the Calculagraph of the prior art was substantially improved. The type faces for producing elapsed minutes, elapsed seconds and time of day recordings have all been changed in the improved recorder. As shown in FIG. 2a of the drawings, a circular photoelectric scanning track 21 is defined as surrounding the dial face 16; the dashed line appearing in the track is not part of the recording, and it has been shown merely for the purpose of assisting the reader in locating the centercircle of the scanning track. A sharply defined scanning mark or timing bar 22 extends radially through the track 2 from a timing line on the dial face, the timing line bein that used to indicate 30 seconds. The mark or bar 2 should sharply contrast with the background color c the track 21, e.g., the line may be black and the back ground may be white. As with the Calculagraph, th dial face 16 and the mark 22 are printed upon connec tion of the toll call.

Figure 2C:
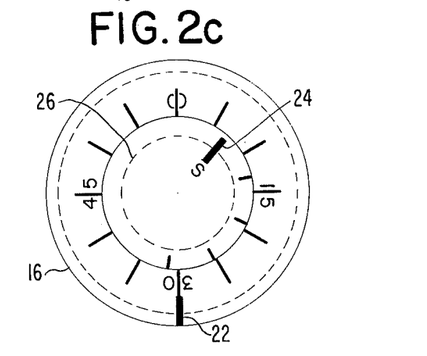
FIG. 2c shows the recordings of FIGS. 2a and 2b superimposed to indicate elapsed seconds.

During the call, the elapsed seconds type face rotate at a seconds rate concentrically within the type fac used to produce the dial 16 and mark 22. At discon nect, the card 10 is reinserted in the recorder and th head carrying the seconds type face is activated to prin a sharply defined elapsed time scanning mark or timin; bar 24 within the dial face 16. The mark 24 extend radially through an elapsed time scanning track 26 where the track 26 is concentric with the track 21 an the dial face. The mark 24, like the mark 22, shoulc also contrast sharply with the background color of th card 10. The elapsed time type face may also includ type for printing a character S adjacent the timing ba 24, indicating that the recording is of elapsed seconds Similarly, a recording of elapsed minutes would appea as shown in FIG. 2c except that the printed letter indi cator would be the letter M. As with the prior art re corder, the elapsed time recordings are made in the areas designated for them in FIG. 1 of the drawings.

Figure 2D:
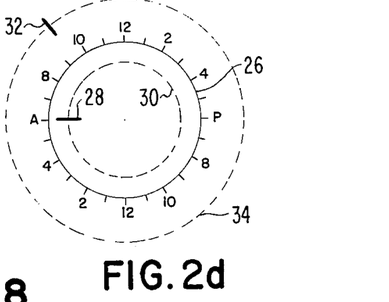
FIG. 2d is an enlarged representation of a machine readable time of day recording as it aapears on a record member that is readable by the apparatus of the invention.

The type faces for printing the time of day, i.e., actuai time as opposed to elapsed time, were also modified in order that a machine readable recording of actual time might be printed on the card 10. A stationary, i.e., non-rotating, printing head is utilized to print a twenty-four hour dial 26; see FIG. 2d. This dial is printed with the same orientation on all record members 10, i.e., as shown in FIG. 1. A second head having a minutes type face rotates concentrically within the head used to produce the dial 26, and a third head having an hours type face, making one revolution per 24 hours, rotates concentrically outside of the head used to produce the dial 26. As with the type faces used to record machine readable elapsed time recordings, the hours and minutes type faces are provided with type for printing sharply defined scanning marks or timing bars within concentric, circular scanning tracks. As is shown in FIG. 2d, a minutes bar 28 is printed in a track 30, and an hours bar 32 is printed in a track 34. In the preferred embodiment, all of the dial faces and scanning tracks are of substantially the same dimensions such that they may be read by a scanning head or by scanning heads of similar construction and dimension.

PREFERRED EMBODIMENT OF THE SCANNING HEAD

A preferred embodiment of the photoelectric scanner head of the invention is shown in FIGS. 3 through 7 of the drawings. The following description is of a single scanner head, it being understood that the number of such heads required for reading a record-bearing member is determined by the number of time divisions that must be read; the number of heads may also be determined by the manner in which the information to be retrieved is recorded on the record member. For example, if the information to be retrieved comprises three separate and distinct recordings of time of day, elapsed minutes and elapsed seconds respectively, as in the telephone toll card situation explained above, the preferred embodiment of a system may require three separate scanner heads of the type described below. Descriptions of systems utilizing one or more heads appear herein under a separate title. The embodiment of the head hereinafter described is capable of reading recordings such as that described in FIGS. 2c and 2d, and it is capable of producing a useful output signal as a function of the information retrieved.

Figure 3:
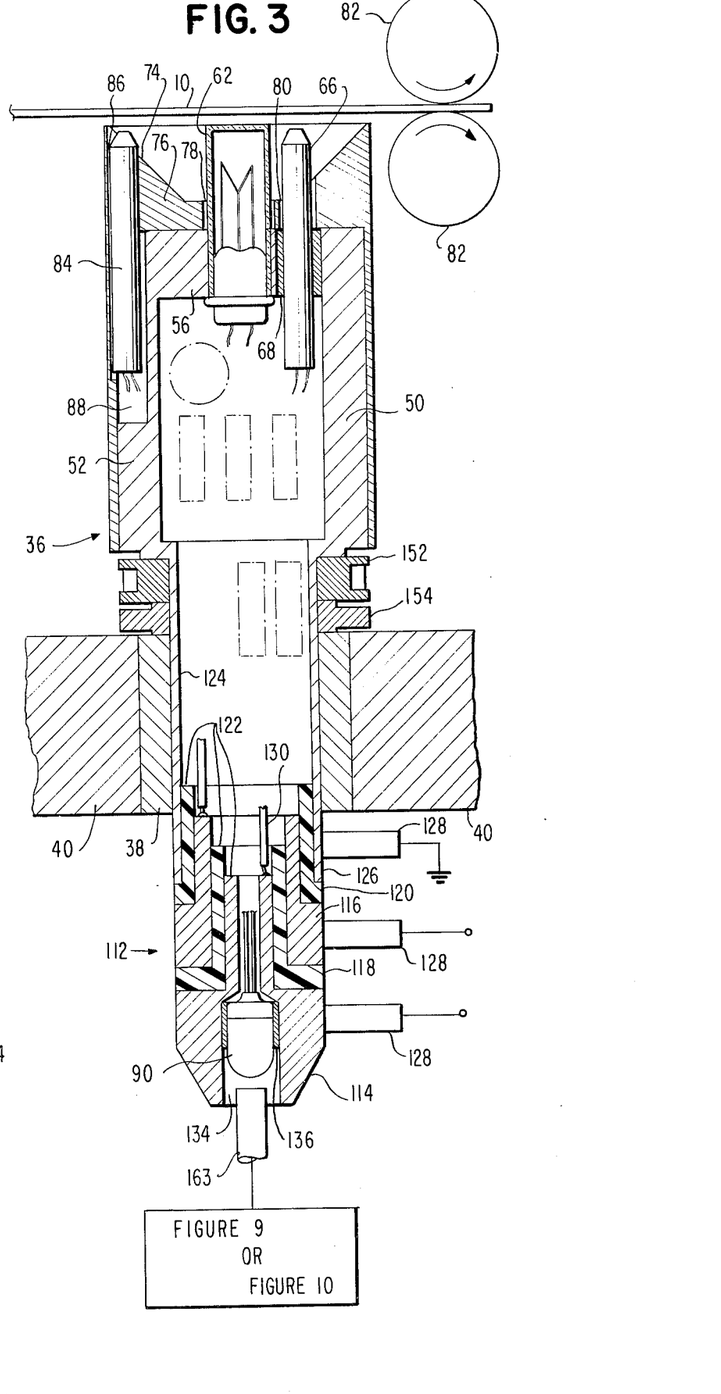
FIG. 3 is an elevation view in section showing the details of a photoelectric scanning head made in accordance with the present invention.
Figure 4:
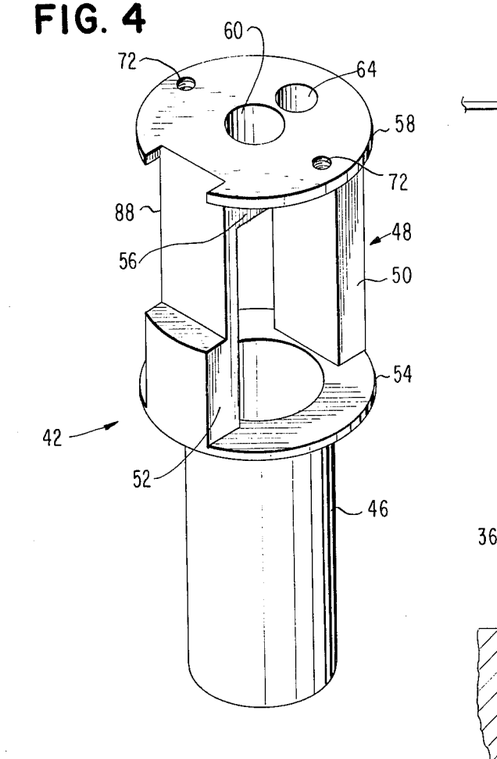
FIG. 4 is a perspective view showing the structural details of the support structure utilized for mounting the photoelectric system of the scanner head.
Figure 5:
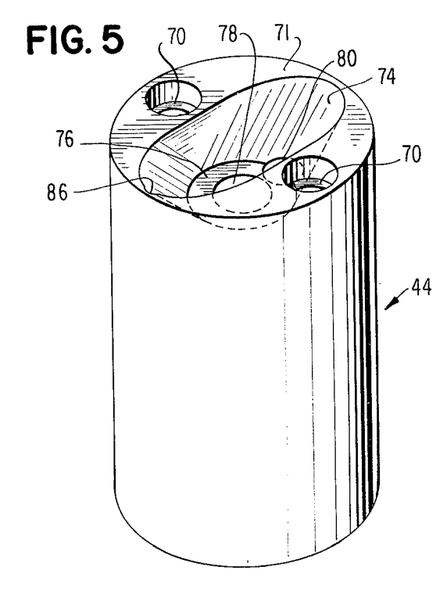
FIG. 5 is a perspective view showing the constructional details of a reflector cap member used with the embodiment of FIG. 3.

Referring now to FIGS. 3 through 6, the scanner head includes a housing 36 supporting a photoelectric system for rotation about a single axis within a bearing 38 in a head mounting plate 40. The housing comprises a generally cylindrical body 42 (FIG. 4) and a cylindrical cap member 44 (FIG. 5). The body member 42, in the preferred embodiment, comprises a single machined unit made out of electrically conductive material. It includes a shank portion 46 on one end, and a pi shaped portion 48 on the other or top end. The pi shaped portion 48 is so called in that it comprises a pair of spaced legs 50 and 52 extending axially of the member 42 from an annular flange 54 located at the upper end of the shank 46. The legs are terminated at the top or upper end of the member 42 by a bridge 56 and a generally circular flange-plate 58.

The bridge 56 and flange 58 are provided with a first hole 60 located on the axis of the member 42 and the axis of revolution for the system. A suitable source of illumination 62, for example, a lamp is supported by the bridge and the plate, as by being cemented to the wall of the hole 60, so as to extend axially from the flange 58. A second hole 64, in the bridge 56 and plate 58, is located in radial displacement from the hole 60. The hole 64 is used to provide a mounting for a stop or OFF photocell 66, i.e., a photocell the function of which is to read the elapsed time mark 24 of the recording shown in FIG. 2c of the drawings or the minutes mark 28 shown in FIG. 2d. Accordingly, the center line of the hole 64 should be radially displaced from the axis of revolution of the member 42 by a distance equal to the radial distance from the center of the recordings shown in FIGS. 2c or 2d to the centercircle of the scanning tracks 26 or 30. The stop photocell 66 is supported within the hole 64 so as to extend out of the top of the member 42 along a line taken parallel to the axis of the member. In that the stop photocell is located relatively close to the lamp 62, it was found desirable to secure the photocell within a sleeve 68 of suitable heat insulating material and to secure the sleeve to the wall of the hole 64 by suitable means such as by cementing.

The cap member 44 is constructed so as to cover and be secured to the pi section 48 of the member 42. To this end, the cap member is provided with a pair of holes 70 on an upper surface 71, which holes, when the cap member is assembled with the member 42, are coaxial with a pair of holes 72 in the flange plate 58. Suitable securing means, such as screws, may be utilized to lock the two members together.

The cap member 44 functions as a means for directing light from the lamp 62 onto the recording from which information is to be retrieved. To this end, the cap member is made of metallic material, and it is provided with a light reflecting cavity 74 extending from the surface 71 in a downwardly or rearwardly direction. The cavity appears frustoconical in cross section in FIG. 3, and it is terminated at its downward end by a generally circular wall 76. The wall 76 abuts on the flange 58 when the two members are assembled, and it is provided with a pair of spaced holes 78 and 80 which permit the lamp 62 and stop photocell 66 respectively to extend into the cavity 74. The holes 78 and 80 may be of larger diameter than the lamp and the photocell such that the cap may be adjusted slightly in angular position and such that the cap may be thermally insulated from the lamp 62. As is evident from FIG. 3, when the members 42 and 44 are assembled, the upper or outer surface of the lamp 62 is co-planer with the surface 71 of the cap member. This construction permits the lamp and reflecting cavity to cooperate such that when the scanning head is positioned to retrieve information from a card 10, light, from the source 62, is directed towards the recording to fully illuminate same. In the preferred embodiment, the scanning head is supported by the head mounting plate 40 such that the surface 71 of the cap member 44 is approximately 1/32nd of an inch beneath a card 10. As is diagrammatically illustrated in FIG. 3, the card 10 may be brought to a position directly above the head by conventional means such as by driven rollers 82 of a conveying machine or by other suitable means such as a card carriage or the like.

The cap member 44 also serves as a mounting means for a start or ON photocell 84. As will be seen in FIG. 5, the cavity 74 is ellipsoidal in cross section at and near the surface 71. The construction of the cavity 74 is such that when the members 42 and 44 are assembled, the axis of revolution of the member 42 (or center line of the hole 78) and the center line of the hole 80 for the stop photocell 66 are perpendicular to and pass through the major axis of the ellipsoidal section of the cavity in the surface 71. The member 44 is provided with a hole 86 wherein the start photocell 84 may be secured by conventional means such as a set screw. The center line of the hole 86 also is generally perpendicular to and intersects the major axis referred to above. In addition, the center line of the hole 86 should be radially displaced from the center line of the hole 78 by a distance generally equal to the radial distance from the center of the recordings of either of FIGS. 2c or 2d to the centercircle of either of the respective scanning tracks 21 or 34. This construction permits each photocell to read the entirety of the scanning track with which it is associated.

It should be apparent that the structure described above may be modified. In particular, it may be found desirable to substitute a pair of light sources for the lamp 62. In the event that such a modification is made, each lamp of the pair should be supported closely adjacent to a photocell and in non-touching relationship. Of course, with such a modification, the cavity 74 becomes unnecessary.

Referring to FIG. 4, it will be noticed that flange plate 58 and leg 52 are provided with a notch and recessed portion 88 for the purpose of providing a housing in cooperation with the cap member for the start photocell 84 and to provide space for the photocell's electrical leads. It will be noticed that in the assembled condition of the members 42 and 44, the photocells 66 and 84 are located on opposite sides of the axis of revolution, thus they are angularly separated by 180°. In practice, the radial positioning of the cap 44 and thus of the two photocells is fixed by the flange 58; the holes 70 for the locking screws are such that a slight angular adjustment of the start photocell relative to the stop photocell can be made.

As described so far, it will be seen that the ON photocell 84 will respond to a timing bar 22 or 32 in that it is mounted to scan tracks having a mid-radius equal to that of the tracks 21 and 34. The stop photocell 66 responds to timing bars such as 24 or 28 in that it is mounted to scan tracks having a mid-radius relative to the dials and equal to that of the tracks 26 or 30. Referring to FIG. 2c, it will be recalled that the timing bar 22 is printed with or at the same time as the dial face. The bar 22 is thus located at a reference position indicative of 30 seconds in the elapsed seconds record. In the preferred embodiment, the elapsed minutes recording also uses a reference timing bar at the 30 position. The 12 midnight position is used for reference purposes for the time of day recording of FIG. 2d but the reference point is obtained in a different mancalibration on the dial of FIG. 2c for the reason that the cell 66 is supported by the scanner head at an angle of substantially 180° with respect to the position of the cell 84.

The photocells are used to operate a signal generator 90, and specifically, the ON photocell 84 switches the generator on and the OFF photocell switches the generator off. In the preferred embodiment, the signal generator is a source of invisible radiation, e.g., it may be a solid state infra-red lamp. In the alternative, the signal generator could be a source of visible radiation such as a neon lamp. The signal generator is operatively connected to the photocells 84 and 66 by a transistorized switching circuit, the components of which can be mounted on circuit boards and supported by the scanning head within the space existing between the legs 50 and 52 and within the hollow shank 46 of the member 42.

Figures 6, 7:
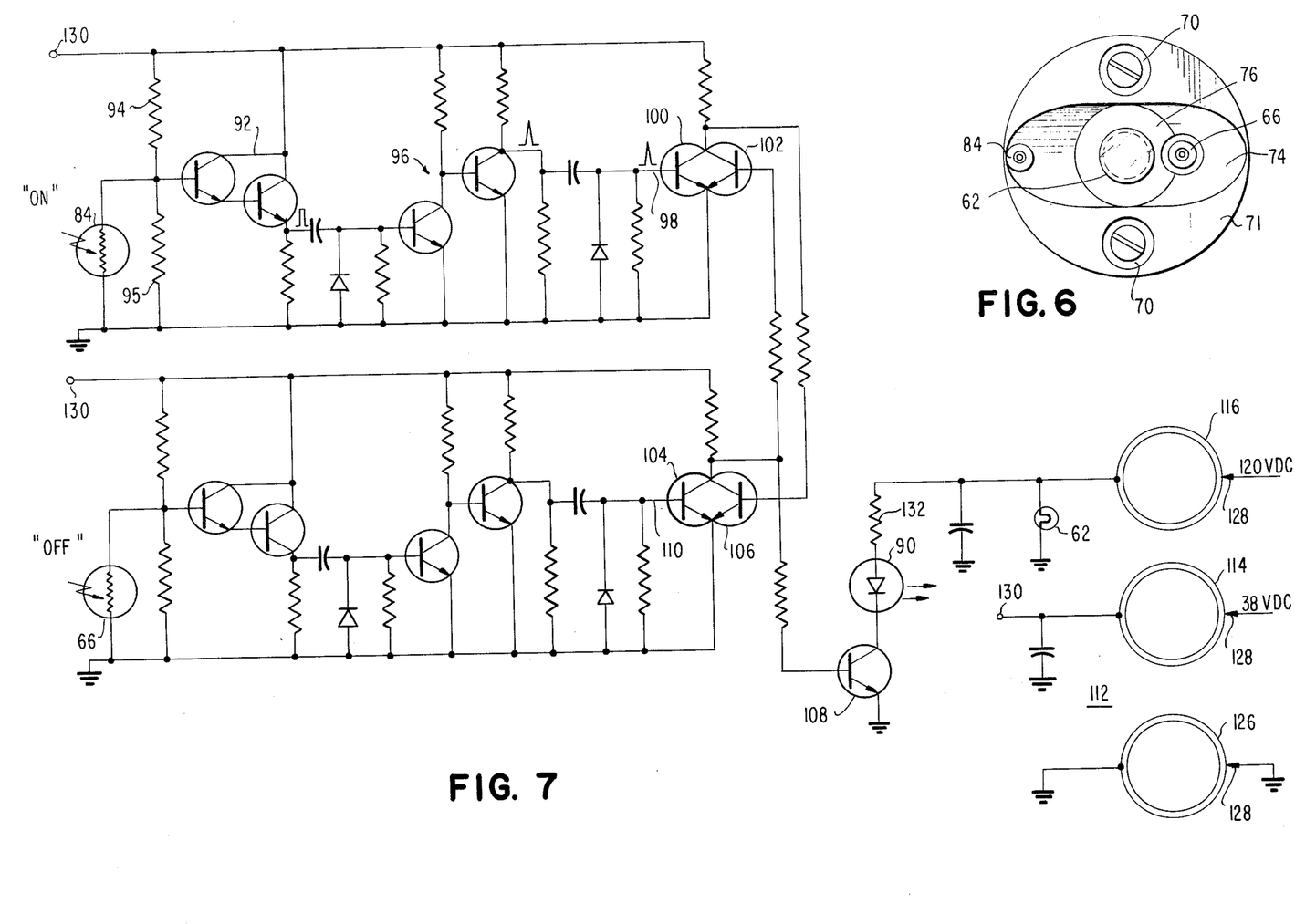
FIG. 6 is a plan view of the scanner head of FIG. 3.
FIG. 7 is a schematic diagram of the photoelectric circuits of the scanning head of FIG. 3.

A circuit that is suitable for the purpose of switching the signal generator 90 on and off is shown in FIG. 7 of the drawings. The start photocell 84 is connected between the input base electrode of a Darlington amplifier 92 and ground. A voltage divider comprising a pair of resistors 94 and 95 is connected between a d.c. source and ground with the junction of the voltage divider being connected to the input electrode of the Darlington amplifier. The start photocell 84 responds to light as it is scanned over the track 21, and it therefore effectively places the input of the amplifier at ground, i.e., light as it is scanned over the track 21, and it therefore effectively places the input of the amplifier at ground, i.e., effectively shorts the resistor 95, until such a time as the photocell passes from light to dark. In the scanning operation, this last named event will occur, for example, when the photocell 84 is rotated past the reference mark 22 in the ON scanning track 21 of the elapsed time recording. The photocell, upon seeing the mark 22, becomes a high impedance to ground and thus the voltage at the input electrode is a pulse developed across the resistor 95.

The output of the amplifier 92 is a squared pulse of short duration. This pulse is differentiated, and the resultant pulse is amplified by a direct coupled amplifier 96. The pulse outputted by the d.c. amplifier is further defined by a second differentiator having a faster time constant than the first such stage, and the resultant pulse or spike is applied to a set input 98 of a bistable multivibrator comprising a first pair of paralleled transistors 100 and 102 and a second pair of paralleled transistors 104 and 106 connected in the usual configuration. The transistors 100 and 102 are rendered conductive by the input pulse, the transistors 104 and 106 are thus rendered non-conductive. The common collector of the transistors 104 and 106 is connected to the base electrode of a switching transistor 108. Accordingly, when the transistors 104 and 106 are rendered non-conductive as a result of the input pulse on the set input of the multivibrator, the base electrode of the transistor 108 goes high and the transistor conducts for so long as the multivibrator remains set.

As is shown in FIG. 7, the signal generator 90 is connected between a d.c. source and the collector of the switching transistor 108. Accordingly, the generator is rendered conductive such that it emits radiation when the transistor 108 is rendered conductive. The generator will continue to emit radiation until such a time as the transistor 108 is rendered nonconductive.

Turn off is achieved by the off photocell 66, e.g., as by being rotated past the elapsed time mark 24 located in the scanning track 26. The off photocell 66 is connected by a pulse amplifying and shaping circuit of precisely the type described above with respect to the photocell 84 to a reset input 110 of the bistable multivibrator. Accordingly, the transistors 104 and 106 are rendered conductive in response to a pulsing of the photocell 66, and they thereby return the base electrode of the transistor 108 to effective ground such that the generator ceases to emit radiation.

Referring now to FIGS. 3 and 7, it will be noticed that in the preferred embodiment, electrical energy is supplied to the circuits and lamps of the scanning head by a slip ring assembly 112. The assembly includes a pair of slip rings 114 and 116, and it includes a pair of spacer members 118 and 120 of electrically insulating material. Each of the rings and each of the spacers is provided with a generally ring-like portion and a hollow and cylindrical projection 122. The projections 122 are each of increased diameter such that the slip rings 114 and 116 may be nested with the spacers 118 and 120, and the assembly thus formed may be frictionally secured and/or cemented to an inside wall 124 of the shank 46 at the downward or rearward end of the member 42. The slip ring 114 is insulated from the ring 116 by the spacer 118, and the ring 116 is insulated from the metallic shank 46 by the spacer 120. A portion 126 of the shank, located immediately above the spacer 120, is also used as a slip ring. The usual brushes, e.g., carbon brushes 128, may be employed in conventional brush mountings (not shown) to connect the slip rings to external circuits.

In the preferred embodiment, the slip ring 114 is connected through a brush 128 to a 38 V.D.C. supply and is utilized to supply d.c. potentials over a line 130 to the transistor circuits used to operationally connect the photocells 66 and 84 to the signal generator 90. A 120 V.D.C. supply is connected to the slip ring 116 through a second brush 128. This supply is utilized to provide energy directly to the lamp 62 and to provide d.c. power through a voltage dropping resistor 132 to the signal generator 90 and switching transistor 108. Each of the d.c. supplies may be pulse decoupled from the circuits to which they are connected by capacitors. In the preferred embodiment, the slip ring portion 126 of the shank 46 is used to provide a common electrical ground for both d.c. supplies through a third brush 128.

As is shown in FIG. 3, the generator 90 may be mounted within a centrally located and open cavity 134 drilled or otherwise made within the slip ring 114 at the rearward end of the slip ring and of the scanning head. The generator may be cemented to a ring-like spacer 136 and the spacer in turn may be secured, as by cementing, to the wall of the cavity.

It should be apparent that the scanner head described above generates a pulse of radiant energy as the head output signal regardless of whether the information obtained by the head is a recording of the type depicted in FIG. 2c or of the type shown in FIG. 2d. In both cases, the generator is turned on when the photocell 84 sees the timing bar 22 or the bar 32, and the generator is turned off when the photocell 66 sees the timing bar 24 or the bar 28 as the case may be.

When the recording is one of elapsed time, FIG. 2c, the head output pulse is a function of the angle formed between the timing bars 22 and 24. As explained above, the timing bar 22 is located at the 30 seconds (or minutes) calibration mark and is used as a reference point. Since the cells 84 and 66 are physically separated by an angle of 180°, the generator effectively comes on as the OFF cell 66 is moved past the 0 calibration mark on the dial 16 and it is turned off when the cell sees the timing bar 24.

Since the time of day recording contains information in at least two different units of time, e.g., hours and minutes, the scanner head output pulse must contain information regarding the location of both timing bars relative to the clock face. As in the elapsed time case, the timing bar 32 is effective to turn the scanner head generator on and the bar 28 effects a turn-off of the generator. It will be apparent that if a reference point is taken with respect to an arbitrary time calibration line on the clock and if the head generator's output is referenced to the calibration, then the starting and stopping points of the head generator are determined relative to the clock face. For example, the scanner head may be provided with means for generating a reference pulse each time the photocell 84 passes the 12 midnight calibration line on the dial face. A time differential will then exit between the occurrence of the reference pulse and the turn-on point in time of the generator 90. This time differential corresponds to the angular separation of the 12 midnight calibration line and the hours timing bar 32. Similarly, the 12 midnight reference pulse is effectively a 12 noon reference pulse insofar as the off photocell is concerned. Accordingly, a second time differential exists between the occurrence of the reference pulse and the turn-off point in time of the generator 90. The second time differential corresponds to the angular separation of the 12 noon calibration line and the minutes bar 28. It will therefore be seen that the output of the scanner head in this case is a pluse that is a function of the difference in the two time differentials, or, i.e., the difference between the two respective corresponding angles.

In the time of day case, the reference pulse may be provided in any of several ways, e.g., the head may have a cam mounted thereon for operating an external switch everytime the cell 84 is rotated past the 12 midnight position. An example of means for providing the reference pulse will be described below with respect to FIG. 9.

SECOND EMBODIMENT OF THE SCANNER HEAD

Figure 8:
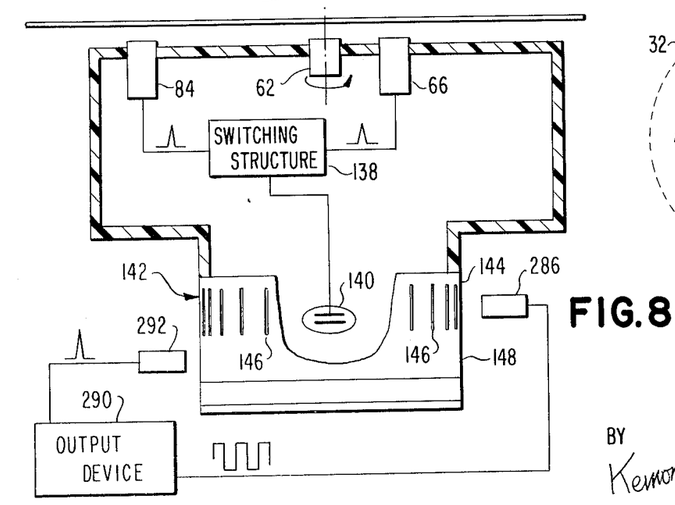
FIG. 8 is a schematic representation of a second embodiment of the invention.

A second embodiment of the scanning head has been shown schematically in FIG. 8 of the drawings. As shown therein, the start and stop photocells 84 and 66 respectively are located in a supporting structure that is basically of the type described above. Similarly, a source of illumination 62 is employed and the photocells operate a switching structure 138 to thereby turn a radiant energy emitter, such as a lamp 140, on and off where the on time of the lamp is a function of the angle between the marks as discussed above. However, the signal output of this embodiment is a series of pulses where the number of pulses outputted by the scanning head is a direct function of the elapsed time read by the scanner; or it is a series of pulses where the number of pulses is a function of the angular separation of the marks indicating actual time.

The structure of this embodiment of the invention differs from the previously described embodiment in that the shank 46 of the member 42 is provided with a cylindrical section or window 142 of optically transparent material such as Lexan (registered trademark). The window 142 is divided axially of the scanning head into a cylindrical light chopping section 144 having a plurality of equally and circularly spaced opaque-to-light bars 146, and into a cylindrical clear section 148. The lamp 140 is mounted in the head so as to radiate light, during those periods that it is on, through both sections of the window 142.

The above given description of scanning heads made in accordance with the invention was based on structures capable of retrieving information pertaining to time and recorded on a card in the manner shown in FIGS. 2c and 2d. Obviously, modifications can be made to the structure when used for the purpose described, e.g., it would be possible to utilize self-contained d.c. supplies within the scanning head, but the structure shown is preferable in that it would be more compact, lighter in weight and less expensive in that it makes use of existing electrical supplies. Too, the structures described may be modified to accommodate recordings that differ from those shown in FIGS. 2c and 2d. For example, a single recording might contain elapsed time information in both seconds and minutes through the use of additional concentric scanning tracks. In such a case, additional read photocells could be added to the head depicted in FIGS. 3 through 6, and such photocells might either collectively operate a single generator 90 in a serial process to provide a serial output of pulses containing different information from the head. Alternatively, additional signal generators may be supported within the scanning head and one such generator may be located adjacent to an optically clear window such that the head provides parallel outputs related to different information inputs. In such a case, only one reference mark would be necessary. Other modifications will occur to those skilled in the art to which the invention pertains.

DESCRIPTION OF PREFERRED PHOTOELECTRIC SYSTEMS

It will be recognized that the scanning heads as described above, and particularly the scanner head shown in FIGS. 3–7, provide output signals that are useful to control the operation of a large variety of output devices. For example, the output signals may be utilized to control the operation of an automatic sorting machine, an automatic punch, an electric typewriter, a recorder, or the like. As will be recognized, the actual utilization device will be determined in part by the needs of the user. These needs, in many cases will be in turn determined by the equipment the user already has on hand. For example, telephone operating companies presently employ automatic accounting machines that require telephone toll cards to be sorted according to elapsed time before the accounting machines can accept them; such companies presently have the cards sorted manually. Accordingly, an automatic sorting machine would be very useful in that it could work a substantial cost savings by substantially eliminating the manual function in situations of this type.

On the other hand, it may be that a user's needs are such that a tape must be prepared in order that the information obtained may be used by another machine. For that matter, the systems described below might be employed directly with computing devices. Of course, in each of these last named use possibilities, other equipment may be necessary for the purpose of relating the information obtained by the systems of the present invention to the document or card from which the system obtained the information. The qualification "may be" is employed for the reason that the identification of the source of information is necessary if the systems are of the automatic billing type employed by large companies. On the other hand, the systems may be employed for statistical purposes in which case the information obtained from the card is all that is important.

Figure 9:
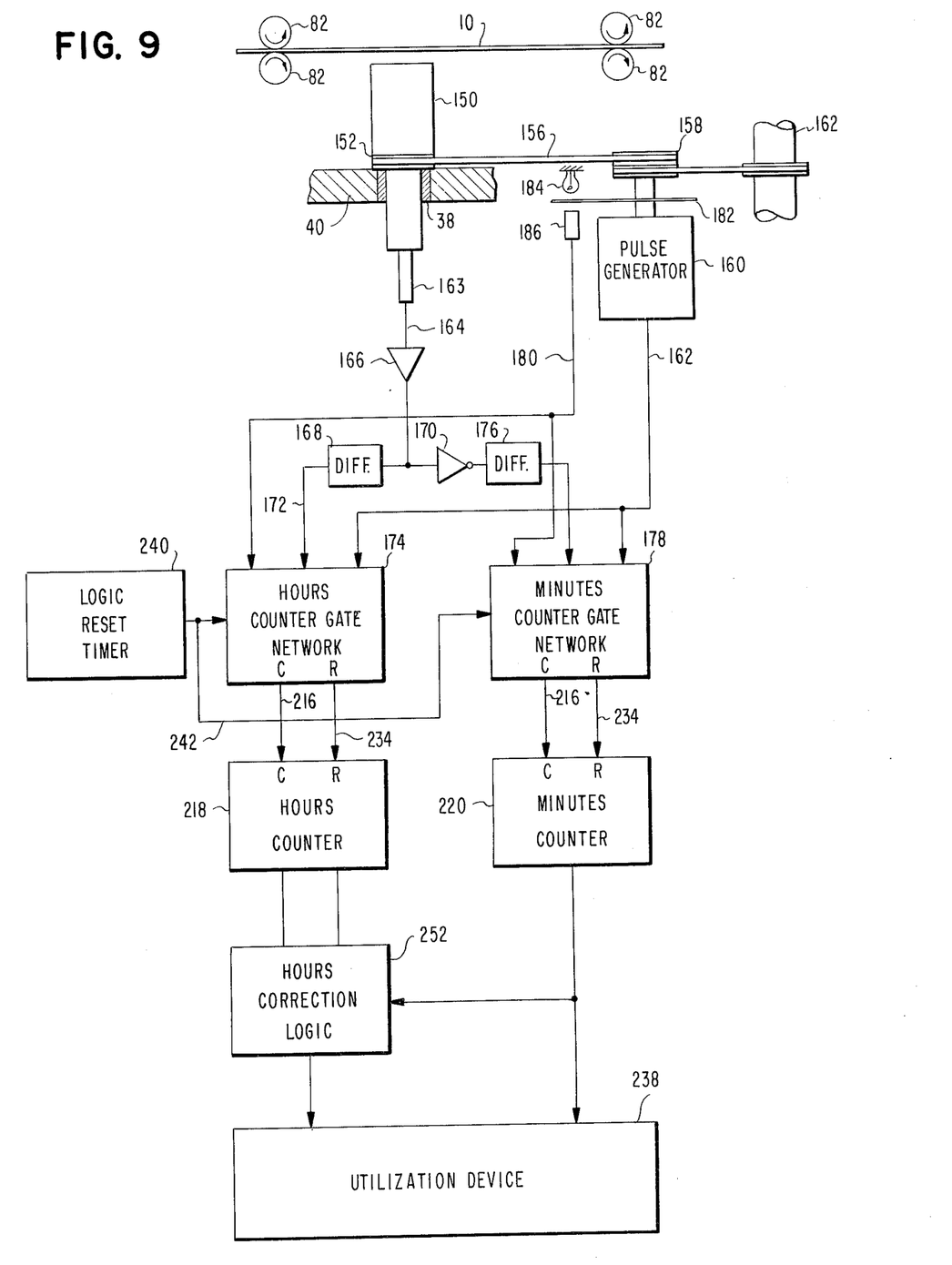
FIG. 9 is a block diagram of a photoelectric system employing a scanner head of the type shown in FIG. 3 to provide a corrected electrical analogue of the time of day recording shown in FIG. 2d.
Figure 10:
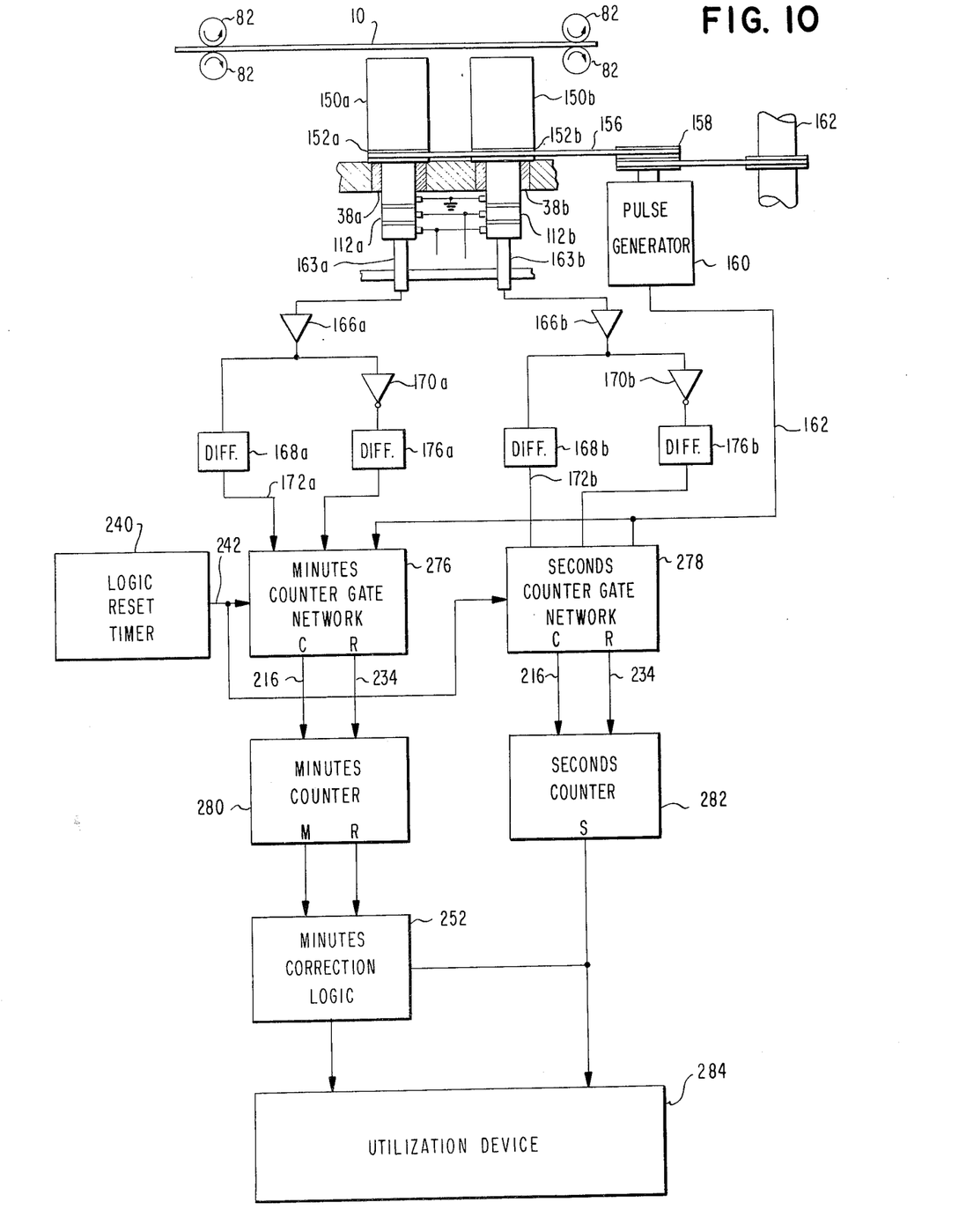
FIG. 10 is a block diagram of a photoelectric system employing two scanner heads of the type shown in FIG. 3 to provide a corrected electrical analogue of an elapsed minutes recording and of an elapsed seconds recording where each of the said recordings are of the type shown in FIG. 2c.

Referring to the drawings, photoelectric systems, including heads of the type described with reference to FIGS. 3–7, are shown in FIGS. 9 and 10. Each system utilizes the radiant energy pulses emitted by the scanner heads for the purpose of providing electrical analgoues of the information recorded on the card 10 to a utilization device or devices.

As shown in FIG. 9, a head 150 may be supported by a plate 40 as previously described adjacent a card conveying apparatus or carrying apparatus. If the conveying apparatus is of the continuously driven type, then appropriate means should be interposed in the path of travel of the card for stopping the card for a length of time that is at least sufficient to permit a reading operation to be carried out by the head 150. The length of the card dwell for reading purposes at a reading station is a function of a number of variables including the nature of the information to be retrieved by the scanning head and the type of utilization device employed with the systems of this invention. This subject will be discussed in greater detail below regarding the systems of this invention employed to convert data of the type described above with respect to FIG. 2. For rotational drive purposes the head 150 may be provided with a gear pulley 152 (FIG. 3) pressed fitted to the shank 46 of the member 42. A spacer 154 may be interposed between the bearing portion of the plate 40 and the pulley so as to provide additional means for fixing the axial position of the pulley relative to the shank. The pulley is engaged by a toothed timing belt 156 which belt also engages a gear pulley 158 mounted on the drive shaft for a rotary pulse generator 160. In the preferred embodiment, the pulleys 152 and 158 are of the same diameter and the belt is powered by a rotating source 162 such that the head 150 and the generator 160 are rotated at the same speed. The actual speed of rotation for any given system will be, in part, determined by the requirements of the utilization device as explained above. In a system according to FIG. 9 that has been constructed the drive speed was 20 revolutions per second.

The generator 160 may be a transducer of the type that produces a fixed number of pulses for each complete revolution of the generator's drive shaft. A generator that is suitable for use in the systems of this invention is manufactured and sold by M. L. Stern Co., Inc., of Charlotte, North Carolina, under the name of Optitac, Model ST 270. It utilizes a photoelectric system including a slotted disc member to produce 480 electrical pulses on a generator output line 162 for each complete revolution of the generator shaft.

The system of FIG. 9 is particularly useful for responding to a scanner head output signal that contains information pertaining to actual time, FIG. 2d, and it does so by using the scanner head output signal to generate binary numbers representing the hours and minutes shown on the recording. To this end, a radiant energy detector 163 (FIGS. 3 and 9) which may be a photocell such as the LS 400 sold by Texas Instrument Company is positioned within or partially within the cavity 134 so as to be responsive to pulses of radiant energy produced by the signal generator 90. As previously stated, the start time of each such pulse is a function of the angular position of the scanning mark 32 and the stop or off time is a function of the angular position of the minutes timing bar 28. The detector 163 converts radiant energy pulses to electrical pulses on a line 164 which pulses have leading and trailing edges that have time correspondence to the start and stop times of the radiant energy pulses.

Pulses on the line 164 are amplified by an amplifier 166 and applied to the input of a differentiator 168 and to the input of an inverter amplifier 170. In the preferred embodiment the amplifier 166 is constructed so as to preserve phase. The differentiator 168 is operative to produce voltage spikes, i.e., sharply defined pulses, from the leading edges of pulses outputted from the amplifier 166, and the voltage spikes thus produced are applied over a line 172 as an input to an hours counter gate network 174. Pulses on the output of the amplifier 166 are inverted by the inverter amplifier 170 and applied to the input of a second differentiator 176. The differentiator 176 is operative to produce voltage spikes from the trailing edges of pulses produced by the detector 163 and these voltage spikes are applied as an input to a minutes counter gate network 178. The counter gate networks 174 and 178 are each connected on respective second inputs to the line 162 such that the said networks receive pulses produced by the generator 160.

The counter gate networks are also provided with enable inputs connected to a source of start or reference pulses over a line 180. This last named pulse source may comprise a disc 182 mounted on the drive shaft of the pulse generator 160 so as to turn therewith. The disc is provided with a radially extending slot and the disc is turned by the drive shaft such that the slot is in alignment with a source of radiant energy 184 and a detector 186 once for each revolution of the generator 160. The source of radiant energy may be a source of visible or invisible light and the detector may be a photocell or other appropriate device. The slot in the disc 182 is preferably narrow in the circumferential direction of the disc such that the output of the detector 186 is an electrical pulse of short duration each time alignment is achieved. It will be recalled that the pulse generator is turned at the same speed as the scanner head 150. In the preferred embodiment, the disc 182 is positioned on the shaft such that the source 184, detector 186 and the slot are in alignment to produce a start or reference pulse each time the scanner head on photocell 84 passes the 12 midnight calibration and the off photocell 66 passes the 12 noon calibration on the dial face 26. By these means, the start or reference pulse is produced once for each revolution of the scanner head, and since the scanner head photocells can have the above defined orientation only once for each complete revolution of the scanner head, the start pulse also defines a fixed angular relationship of the head photocells relative to the clock dial 26.

Figure 11:
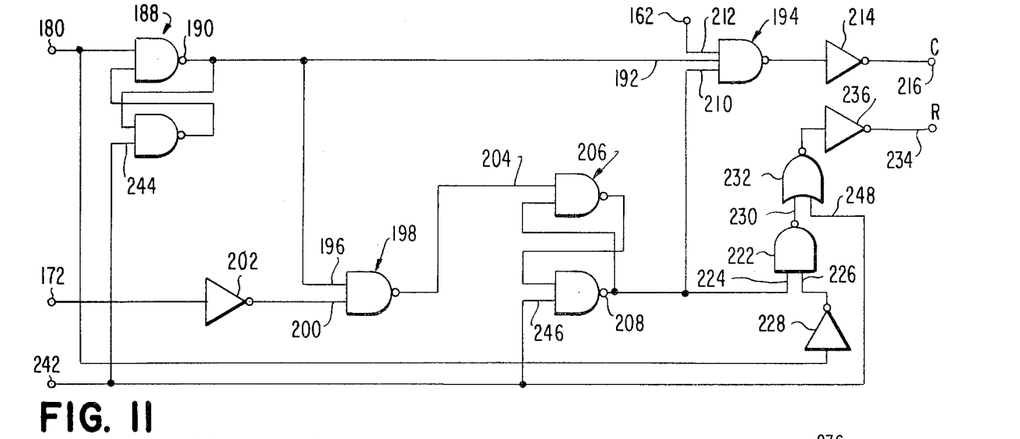
FIG. 11 is a logic diagram of a gating network usable in the systems shown in FIGS. 9 and 10.

The counter gate networks 174 and 178 may be similar in construction and operation and one such network employing negative logic is shown in FIG. 11. With respect to the following description all latches and counters are assumed to be in their reset condition. Referring to FIG. 11, a start pulse on the line 180 is applied to the set input of a NAND bistable latch 188 causing an output 190 to set to a low level voltage. The reset output of the circuit 188 goes to a high level in the usual manner to thereby latch the output 190 at the low level until the circuit 188 is reset. The output 190 of the latch 188 is connected to an input 192 of a three input NAND gate 194 and it is connected to an input 196 of a two input NAND gate 198. The gate 198 is connected on its second input 200 to the output of an inverter 202 where the inverter is connected to receive pulses or voltage spikes on the line 172 from the differentiator 168. The gate 198 is connected on its output to a set input 204 of a second NAND bistable circuit or latch 206. The output of the inverter 202 is normally at a high voltage level to thereby inhibit the gate 198 such that the voltage level at the input 204 of the latch 206 is at a low level. Accordingly, the latch 206 cannot set, i.e., go to a low voltage, until the inputs 196 and 200 of the gate 198 are both at low levels. This event will occur if a start pulse is received by the latch 188 to set its output 190 low and if a voltage spike is received by the inverter 202.

The latch 206 is connected by its reset output 208 to a second input 210 of the NAND gate 194, and the gate 194 is connected by an input 212 to receive generator pulses on the line 162. The gate 194 accordingly will pass generator pulses through an inverter 214 to an output terminal 216 when the latch 188 is in a set condition and when the latch 206 is not in a set condition, i.e., the reset output 208 of the latch 206 is at a low voltage. An hours binary up counter 218 capable of counting 480 pulses (FIG. 9) may be connected to the output terminal 216 to receive the generator 160 pulses gated to said terminal. From the foregoing, it should be apparent, assuming that the latches 188 and 206 have been placed in their reset condition, that a start pulse is effective to open the gate 194 such that it passes generator pulses to the terminal 216 and a voltage spike on the line 172 is thereafter effective to cause the output 208 of the latch 206 to go high to inhibit the gate 194 and thereby prevent the passage of generator pulses to the terminal 216.

As was stated heretofore, the start pulse is generated when the photocells in the head 150 are oriented as stated relative to the 12 o'clock timing lines on the dial 26, and the voltage spike on the line 172 is generated from the leading edge of a pulse produced by the detector 163. The voltage spike is therefore a signal or control pulse indicating turn-on of the generator 90, and as previously described this event occurs when the ON photocell "sees" the scanning mark 32. Accordingly, the spacing between the occurrence of the start pulse and of the voltage spike on the line 172 corresponds to a unique number of generator pulses on the line 162 defining the angular separation of the 12 o'clock midnight timing mark on the dial 26 and the mark 32. The referred to spacing and number of generator pulses are solely a function of angular separation for the reason that the head 150 and generator 160 are driven at the same speed.

The minutes gate network 178 functions in similar fashion except that the differentiator 176 produces a voltage spike from the trailing edge of the analogue pulse produced by the detector 163. The start pulse is effective as previously described to open the output gate to pass pulses from the generator 160 and the spike constitutes a control pulse to inhibit the said gate. In this case, the angle defined is that taken between the 12 o'clock noon calibration line and the mark 28. As in the previously described case a binary up counter 220 capable or receiving 480 pulses (FIG. 9) may be connected to the output terminal of the network 178 to receive pulses supplied to the output terminal of the network 178.

The description thus far has dealt with the operation of the circuit shown in FIG. 9 had with respect to a record like that shown in FIG. 2*d*. It should be recognized that the scanning marks 32 and 28 may be located such that the angle defined by the 12 midnight position and the mark 32 is greater than the angle defined by the 12 noon position and the mark 28. In such a case, the generator 90 comes on after the stop photocell has been rotated past the mark 28. Under such circumstances, the output gate in the network 178 will pass 480 transducer pulses to the counter 220 in that the differentiator 176 does not provide a pulse to thereby effect inhibition of the output gate 194. This situation may be resolved by holding the card 10 at the read station for a length of time that is sufficient to permit the head 150 to make three complete scans or revolutions, and by using the start pulse from photocell 186 to reset the counter 220 to zero.

A circuit that may be employed to reset the counter is also shown in FIG. 11. A NAND gate 222 is connected to receive the inhibit output 208 of the latch 206 on an input 224, and the gate 222 is connected by a second input 226 to receive start pulses on the line 180 through an inverter 228. The gate 222 is connected on its output to an input 230 of a NOR gate 232, and the NOR gate 232 is connected on its output to a counter reset line 234 through an inverter 236. The line 234 is connected to the reset input of the counter. In operation, the inverter 228 maintains the input of the gate 22 high until the inverter receives a start pulse on the line 180 to drive the input 226 low. If the input 224 is also low at this time indicating that the latch 206 has not been set through the receipt of a pulse on the line 172, the NAND 222 output will go high to thereby pulse the counter reset line 234 through the NOR 232 and inverter 236. If, on the other hand, the latch 206 is set during a scanning operation, the latch output 208 goes high to inhibit the gate 222 such that the next start pulse is ineffective in and of itself to reset the counter.

In the description given above, it was assumed that the counters 218 and 220 and the latches 188 and 206 for each gating network were all found in their reset condition. In practice, the said circuits and elements should be reset before a scanning operation is commenced or rephrased; they should be reset subsequent to the acquisition by a utilization device 238 of the data provided on the counter outputs. Accordingly, the timing for the reset is fundamentally a function of the speed with which data may be acquired and/or used by the utilization device. A timer 240 is shown generally in FIG. 9 for providing a logic cancel or reset signal after a predetermined period over a reset line 242 to the gate networks 174 and 178. The timer may be any standard device that is capable of automatically providing pulses that are separated by said period. It is understood, of course, that the length of the predetermined period between such pulses or signals is determined by the nature of the requirements of the utilization device. It should also be apparent that the timer 240 need not be electrically isolated from the utilization device 238 but in fact may be a part of such device or may be controlled by such device.

The line 242 may be connected directly to reset inputs 244 and 246 respectively of the latches 188 and 206 (FIG. 11) such that a pulse on the line 242 is effective to reset the latches. The reset line may be also connected to an input 248 of the NOR gate 232 in each of the gate networks. With this last named connection a pulse on the line 242 will be effective to pulse the counter reset lines 234 such that the counters 218 and 220 reset to zero. Each of the counters 218 and 220 provides a binary output corresponding to the number of pulses received during a scanning cycle. When a pulse generator of the type described is employed, there are 20 generator pulses for each hour of a 24 hour clock and 8 pulses for each minute of an hour. Accordingly, the counter 218 should be provided with five output terminals such that the decimal whole numbers 1 through 24 may be provided on the outputs in their binary form. The counter may also be provided with five additional output terminals such that the remainder or residual pulses from 0 through 19 may be had as counter outputs. The residual pulses represent fractions of an hour and the purpose for providing outputs showing such fractions will appear hereinafter. The minutes counter 220 should be provided with at least six output terminals such that the decimals one through 60 may be obtained in their binary form.

For some use situations, the raw binary analogues may be sufficient to operate a utilization device 238 in which event the residual outputs of the hours counter 218 may be ignored or discarded. On the other hand, in the telephone toll card situation it is desirable to determine whether the output in time units of the higher order, i.e., hours, is a correct indication of the actual time that the recorder was suppose to print on the card 10. It happens that the mechanical elements employed in recorders used to print time are such that the record produced may not accurately locate the higher order indicator. For example, if the actual time is 3:06 PM and if for mechanical reasons such as gear backlash, manufacturing tolerances and the like, the mark 32 is printed close to but not at and not past the 3 PM dial calibration line, the scanner head would have the counter 218 indicating the binary for 2:00 PM and the additional output terminals would show a remainder created by residual pulses of less than 20 in number. The number of residual pulses should be greater than 16 thus indicating that the actual time of day is after 2:48 PM. On the other hand, assuming normal clock accuracy, the minutes counter will have responded to about 48 pulses and indicate a time of about 6 minutes past the hour. The foregoing follows from the fact that on a twenty-four hour clock, the angular separation of any two units is 15° whereas the same separation on the minutes clock is the full dial or, i.e., 360°. Thus, if the same error factor were to be operative in both the hours and minutes data recordings of FIG. 2d the error in the minutes recording is of much less significance than that in the hours recording. It can be taken, therefore, that the binary number of the output of the minutes counter is accurate to an acceptable degree, and accordingly, that number can be used to determine whether there is error in the output of the hours counter.

A circuit 252 for determining error and for performing correction in the vent of error is shown as a block in FIG. 9 connected to receive the outputs of the counters 218 and 220 and it is shown connected to provide a corrected hours count to the utilization device 238. The actual logic employed in the error determination and correction circuit 252 will be determined by the degree of accuracy required in the binary hours analogue for proper operation of the utilization device 238, and the range of use situations extends from those wherein no error checking and correction is necessary to those wherein extremely accurate output signals are required. IN the telephone toll card situation, the billing practices for interstate toll calls are such that rate changes are made at even hour points throughout the day, e.g., person-to-person calls made between the hours of 7:00 AM and 5:00 PM on Mondays through Fridays may be subject to a day rate, and the same calls if made between the hours of 5:00 PM and 7:00 AM on Mondays through Fridays may be accorded the lower night rates. Additional divisions apply for station-to-station calls. Accordingly, if the utilization device operates on a toll ticket, e.g., by punching the time of day thereon, extreme accuracy in the output of the hours counter 218 is not necessary. Taking the situations mentioned above, the general critical hour points for most distance calls within the Continental U.S. are stated in the Washington Metropolitian Area Telephone Directory for 1969–1970 as: 5:00 PM; 7:00 PM; 12:00 Midnight; and 7:00 AM. Referring to FIG. 2d and the 24 hour dial in particular, it will be seen that the hours mentioned correspond to numbers in the decimal systems of 17, 19, 0 and 7 in that order. The output of the hours counter, assuming 100% accuracy, and binary readings of these hours, would be 10001, 10011, 00000 and 00111 respectively, and the number of pulses from the transducer 160 utilized to produce these outputs would be 340, 380, 0 and 140 respectively. Using the counter output for 7:00 AM as an example, the problem occurs if the pulse count recorded in the counter 218 is greater than or less than 140 when the recording on the card, if correctly made, would have resulted in a pulse count of 140 by the counter.

It will be seen that a correct pulse count for every hour time calibration mark should result in an accumulation of (H × 20) pulses in the counter 218 where H is equal to the hour of the day; in the example given, H = 7. Accordingly, an inaccurate recording will result in either the situation where the output of the counter 174 is a number equivalent to H AND A or to the situation (H − 1) AND B; where:

A = any binary number in a set of binary numbers where the numbers of the set are determined by a predetermined number of remainder pulses exceeding (H × 20); and B = any binary number in a set of binary numbers where the nunmbers of the set are determined by a predetermined number of remainder pulses exceeding [(H − 1) × 20].

In the preferred embodiment, all of the numbers A are generated by remainders of 0 to 4 pulses inclusive, and the numbers B are generated by remainders of 16 to 19 pulses inclusive. Accordingly, all outputs of the counter indicating an hours reading between 136 pulses and 144 pulses in the example being discussed, i.e., between 6:48 AM and 7:12 AM, are to be checked to determine correctness. However, in making the error determination, only the numbers A and B need be used and the binary for H can be ignored unless error is found. In the event that an error is found, then the correction can be applied by adding or subtracting a binary one to or from the binary for H.

In order to provide error checking, two sets of binary numbers from the minutes counter 220 are compared with the numbers A and B in the correction logic 252. A first set of numbers $A_1$, of minute counter outputs corresponding to the numbers 000,000 to 001,100 inclusive, represent minute counts of 0 to 12 minutes as the result of the entry of 0 to 96 pulses maximum in the counter 220. A second set of numbers $B_1$, of minute counter outputs corresponding to the numbers 110,000 to 111,011 inclusive, represent minute counts from 48 to 59 minutes as the result of the entry of a minimum of 384 to 479 pulses in the counter.

In the preferred embodiment, the correction logic makes the following decisions: The binary outputs of the counter 218 for H are acceptable if the remainder is A and the minutes output is $A_1$ OR if the remainder is B and the minutes output is $B_1$.

On the other hand, if the hours remainder is A and the minutes output is $B_1$, then the correction logic subtracts a binary 1 from the binary word for H. And, if the hour remainder is B and the minutes output is $A_1$, then the correction logic adds a binary 1 to the binary word for H. The utilization device is then supplied with a corrected hours signal and the minutes signal. If the output device is a punch, the signals are used to selectively operate punch solenoids to perforate the card 10 with the appropriate information.

Figure 12:
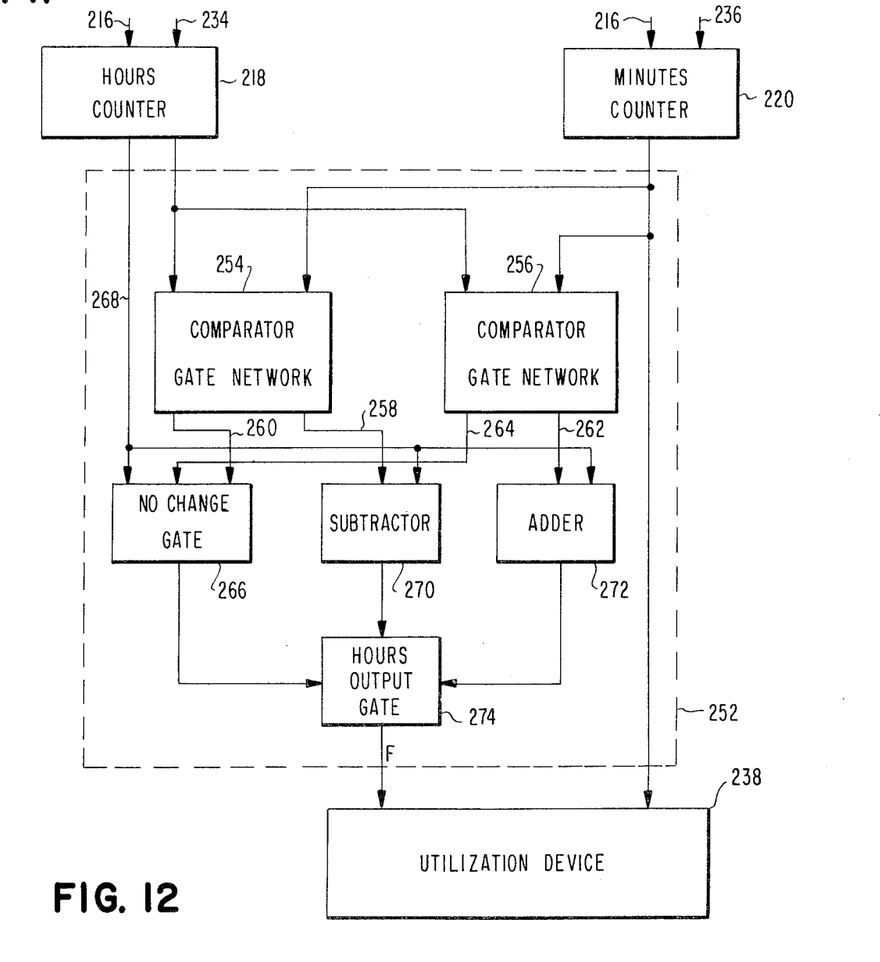
FIG. 12 is a block diagram of an error checking and correction circuit useable with the systems of FIGS. 9 and 10.

A circuit capable of fulfilling the above-noted error determination and correction functions is shown in block form in FIG. 12. The circuit comprises a pair of comparator gate networks 254 and 256 connected to receive the residual outputs of the counter 218 and to receive the outputs of the minutes counter 220. It is the function of the gate network 254 to compare the numbers of the sets A and $B_1$, and to produce an output on a line 258 if any of the numbers of the set A is present simultaneously with any of the numbers of the set $B_1$. If the said numbers are not simultaneously present during a scanning cycle, the comparator produces an output on line 260. Similarly, the comparator gate network 256 functions to produce an output on a line 262 if any of the numbers of the sets B and $A_1$ are simultaneously present and an output on a line 264 if the numbers are not present.

As those skilled in the art will recognize, the actual circuitry employed to produce the comparator gate outputs on the lines 258, 260, 262 and 264 may take any of several logic forms. For example, the residuals outputs of the counter 218 provide the binaries 1, 2, 4, 8 and 16 and their inverted values when both the Q and NOT Q or set and reset outputs are used. The gate networks may then in one form comprise AND-OR logic to accomplish their stated functions. In such form, selected residual outputs may be ANDed with selected inverted outputs, and the outputs of the AND operation may be ORed to produce a positive result whenever there are 0 through 4 residual pulses registered in the counter 218. An indication of zero may be obtained by ANDing all five inverted values. An indication of one is obtained by ANDing the values 1, $\bar{2}, \bar{4}, \bar{8}$ and $\bar{16}$. In similar fashion, the minutes counter outputs may also be logically combined to produce a positive result whenever any of the number of the $B_1$ set are present. Finally, in this form, both OR functions would be connected as inputs to an output AND gate such that the gate produces a positive result on the line 258 when any of the numbers in the sets A and $B_1$ are simultaneously present. The NO comparison output may be obtained by providing the inversion of the line 258 output on the line 260, e.g., by connecting the line 260 to the output terminal of the output AND gate such that line 260 is normally at 1 and goes to 0 when comparison is achieved.

The comparator 256 may employ logic of the same type as that used in the comparator 254 except that in the example being described, the comparison should produce a yes or 1 result on the line 262 whenever any of the numbers of the sets $A_1$ and B are simultaneously present. From the foregoing description, it will be seen that a result appears on the line 258 only when the scanning mark 32 (FIG. 2d) is found in a position indicating 0 to 12 minutes past H simultaneously, i.e., during a scanning cycle, with the scanning mark 28 being found in a position indicating 48 to 59 minutes. A positive result appears on the line 260 for all other possible combinations of locations for the marks 32 and 28. Similarly, a result appears on the line 262 if the scanning mark 32 is found in a position indicating 48–59 minutes past H simultaneously with the scanning mark 28 being found in a position indicating 0 to 12 minutes, and a result is produced on the line 264 for all other combinations of locations of the marks 32 and 28. Accordingly, the simultaneous occurrence of results on the lines 260 and 264 means that no correction is required and that the value indicated by the counter 218 may be directly outputted to the utilization device 238. This situation may be taken as normal in that it is the system's hours count output for all scanning operations except those wherein positive results occur either on the line 258 or on the line 262. For these results, the counter 218 hours outputs may be ANDed in a no change gating network 266 with lines 260 AND 264. That is, the five hours counter output terminals may be connected over a line 268 each to one input of a three input AND gate, the line 260 may be connected to a second input of each said AND gate, and the line 264 may be connected to a third input for each of the AND gates. The outputs of the AND gates then constitute the output terminals of the no change gate network.

The line 268 from the hours counter output terminals may also be connected to inputs of a logic subtractor 270 and to inputs of a logic adder 272. The subtractor may also be connected on an input to receive results appearing on the line 258, and the adder 272 may be connected on an input to receive comparison results on the line 262. The subtractor functions to subtract a binary 1 from the word appearing on the output of the counter 218. To this end, the subtractor may comprise a series of five half subtractors where each half subtractor is connected to receive the output of one counter terminal on one of its input terminals. The first half subtractor, i.e., that receiving the least significant bit from the counter 218 should be connected on its other input terminal to receive results from the comparator 254 over the line 258. The other input of each next significant stage of the subtractor would then be connected to the borrow output of the preceding stage. The output terminals for the subtractor 270 then comprise the output terminals of the half subtractor stages, and these terminals may be ORed by an output OR gate network 274 with the corresponding output terminals of the NO change network 266. It should be recognized that the ORing operation is exclusive, i.e., the output is either the NO change gate output OR the subtractor output but not both outputs. As stated above, the exclusivity for the NO change gate may be accomplished by ANDing the counter 218 outputs with the lines 260 and 264. Accordingly, the NO change gate is inhibited unless both comparators indicate no change. Similarly, the hours counter outputs may be ANDed with the line 258 in the subtractor to inhibit the inputs to the half subtractor stages such that the subtractor provides an input to the output OR gates only if the comparator produces a 1 output on the line 258.

Finally, with respect to the subtractor a special case exists if the information on the card 10 is of the type shown in FIG. 2d. It will be seen that the comparator 254 may call for correction when the counters output is 00,000 (0) or 11,000 (24) where both outputs are valid counter outputs. In such case, the corrected output should be 10,111 (23), and this value will be obtained by the subtractor in the usual course when the counter output is 11,000. The corrected output can be obtained from the subtractor when the inputs are 0's by gating the subtractor inputs together to produce an inhibit signal for the special case. This signal may be applied to an inhibit gate located in the output of the second most significant half subtractor stage. With a circuit of this type the operation 00,000 minus binary 1 results in 10,111 rather than 11,111.

The adder 272 may comprise a series of five half adders where the input half adder is responsive to the least significant hours counter output and to a result on the line 262. Each succeeding stage of the adder would have one input connected to receive the corresponding counter output and a second input receiving the carry output of the preceding half adder stage. The adder output should comprise the output terminals of each half adder stage, and these terminals may be ORed with corresponding terminals of the no change gate and subtractor in the output OR gate network 274. As in the case of the subtractor, the adder's hours inputs should be inhibited such that the adder produces an output only if the comparator 256 produces a positive result on the line 262.

The adder in addition, should be capable of handling the special case that occurs when the hours counter indicates 11,000 (24) and the comparator 256 requires this number to be increased by one. In such an event the adder's outputs should be 00,001. This may be accomplished by ANDing the inverted values of the three least significant hours inputs with the two most significant hours inputs to produce an inhibit signal for the outputs of the two most significant half adder stages. As in the subtractor case, inhibit gates should be located in the outputs of the two most significant half adder stages and operative in response to the said inhibit signal to suppress the outputs.

A system of the same general type as that described above with respect to FIG. 9 is shown in FIG. 10. The system of FIG. 10 is particularly useful for processing scanner head output signals generated as a result of scanning elapsed time recordings of the type shown in FIG. 2c.

A card 10 is positioned as described above such that two spaced scanning heads 150a and 150b may read the elapsed minutes and elapsed seconds data rspectively. The heads may be turned at the same rate of speed through a drive arrangement of the type described above which drive arrangement may also be used to drive the rotary pulse transducer 160. As in the previously described system, the preferred transducer outputs a pulse train having a substantially constant prf of 480 ppr.

As previously described, each of the heads 150a and 150b generates a pulse of radiant energy, where the lengths or widths of the pulses produced are functions of elapsed minutes and elapsed seconds respectively in that the on time of each pulse generator is a function of the angular separation of the marks 24 and 22 of FIG. 2. The pulses outputted by the heads are detected by radiant energy detectors 163a and 163b respectively which detectors convert the radiant energy pulses into electrical pulses having the duration of the radiant energy pulses and having the same starting and terminal points in time as the radiant energy pulses.

The detectors in turn are directly connected respectively to differentiators 168a and 168b, and they are also respectively connected through inverters 170a and 170b to differentiators 176a and 176b. The differentiators 168a and 168b respond to the pulses on their respective inputs by generating voltage spikes or control pulses that are coincident in time with the leading edges of the signal pulses, and the differentiators 176a and 176b respond by generating control pulses that have time coincidence with the trailing edges of the input electrical pulses.

The differentiators 168a and 176a are connected to control the operation of a minutes counter gate network 276, and the differentiators 168b and 176b are connected to control the operation of a seconds counter gate network 278. Each of the gate networks may be similar in construction and operation to the networks 174 and 178 of FIG. 9 as shown in FIG. 11. The difference is that the outputs of the differentiators 168a and 168b are applied to the set inputs 180 over the respective lines 172a and 172b of the respective latches 188 so as to control the operation of the gates 194. Accordingly, with the system of FIG. 10, it is the fact of recognition by the scanning head of the mark 22 that is operative to open the gates 194 such that generator pulses on the line 162 are passed to the output terminals 216 of the respective gate networks 276 and 278. The output terminal 216 of the network 276 is connected to the input terminal of an elapsed minutes binary up counter 280, and the output terminal of the gate network 278 is connected to the input of an elapsed seconds binary up counter 282.

The gate networks and counters may be reset by the timer 240 as previously described except that the reset line 242 may be tied directly to the counter reset line 234. In addition, the situation described above with respect to the system of FIG. 9 regarding the need for two and preferably three scans of the record member does not exist with respect to recordings of the type described with respect to FIG. 10. Accordingly, the gate networks 276 and 278 do not require the reset circuit comprised of the NAND 222, NOR 232 and inverter 236 of FIG. 11. It should also be noted that the dwell time for a card at the read station is less for the system of FIG. 10 than for the system of FIG. 9; the said time for the system of FIG. 10 should be sufficiently long to permit two complete scans of the heads 150a and 150b.

As with the previously described embodiment, the outputs of the counters 280 and 282 may be provided as direct inputs to a utilization device 284 which device may be any of the devices previously mentioned. On the other hand, it may be desirable to provide error checking and correction circuitry for reasons similar to those stated above with respect to the system of FIG. 9. In the interstate telephone toll situation, charges are usually based on the length of the call with the basic time divisions being in minutes, e.g., a charge may be based on multiples of three minutes. Accordingly, in such a case, error checking and correction may be desirable with respect to the outputs of the minutes counter 280. Logic of the same general type as the error determination and correction logic 252 employed in the hours correction case may be used with the system of FIG. 10.

In the event that the transducer 160 is of the type described herein, the counter 280 may have at least nine outputs where the first three outputs would comprise the outputs of a modulo 8 divider and the last six outputs would constitute the elapsed minutes outputs of the counter. Thus, whenever the number of pulses entered into the counter constitutes an unven multiple of 8, an output determined by 1 through 7 remainder pulses will appear on the three remainder outputs $R_1$, $R_2$, and $R_4$ of the divider. Consequently, the divider output can go from 000 to 111. Since it is the change over point from a minute M to M plus one that is of interest, it is only necessary that remainders produced by 0 OR 1 OR 2 OR 3 AND 6 OR 7 pulses be compared with the output of the elapsed seconds counter 282.

Although it is not essential to use all possible combinations of seconds counter outputs for comparison purposes, it may be found convenient to do so. To meet the ideal, the seconds counter outputs should be logically combined to produce two outputs, i.e., a first output indicating a total count no greater than 239 pulses, and a second output indicating a minimum count of 240 pulses. As a practical matter, the counter 282 may be provided with nine stages such that the most significant output terminal is binary 32 ($S_{32}$) and is activated by 256 pulses; checking and correction can then be obtained by comparing the binary 32 output with the remainder outputs ($R_1$, $R_2$, $R_4$) of the minutes counter. With this approach, the following error checking and correction conditions are performed by the correction circuitry 252:

1. Add a binary 1 to the minutes count whenever the counter outputs are: $R_2 \cdot R_4 \cdot \overline{S}_{32}$ 2. Subtract a binary 1 from the minutes count whenever the counter outputs are: $\overline{R}_4 \cdot S_{32}$ 3. Accept the binary count for minutes whenever the counter outputs are:
   a. $R_2 \cdot R_4 \cdot S_{32}$
   b. $\overline{R}_4 \cdot \overline{S}_{32}$ It will be recognized by those skilled in the art that modifications can be made to the systems described above and that the same or similar results may be obtained. For example, if a scanning head of the type shown in FIG. 8 is employed, then the pulse transducer 160 may be dispensed with in that the output of the head is a series of pulses that can be detected by a detector 286 and entered into a counter. The counter gate and utilization device is shown generally as an output device 290 in FIG. 8. Reset can be obtained by positioning a second detector 292 adjacent a clear section of the optical window such that when the generator 140 first comes on the gate is opened and the counter is reset to zero.

Other modifications will occur to those skilled in the art. For example, the systems of FIGS. 9 and 10 might be combined into one system operating either one or two utilization devices. Of course, if this modification is made, the card dwell time will be determined by that portion of the combined system represented by the system of FIG. 9.

It should also be apparent that the system of FIG. 10 can be modified by eliminating one head and part of the circuitry in the event that the card 10 is moved such that the elapsed time recordings thereon are presented sequentially to one head. In this case, if correction is required it will be necessary to store the count obtained from the first reading in order to use it for correction purposes. Other modifications will occur to those skilled in the art. Having described the invention, We claim:

1. A data record sensing system operative to retrieve data relating to time, the data appearing on a record member as scanning marks angularly related in a circular format, and the system being operative to convert such data into electrical signals, the system comprising:
   a rotatable scanner head mounting scanning mark sensors and a scanner signal generator, the sensors being effective upon rotation of the head to switch the generator on upon sensing a first scanning mark and off upon sensing a second scanning mark,
   a rotatable pulse generator providing a constant number of pulses for each complete rotation of the generator and providing a reference pulse whenever the mark sensors are located in a predetermined position relative to the circular format on the record member;
   pulse counting means for providing a system output comprising an electrical binary analogue of the data appearing on said record member; and
   circuit means responsive to said reference pulse to connect said pulse counting means to receive pulses from said generator and responsive to signals from said scanner signal generator for inhibiting the further receipt of said pulses by said pulse counting means.

2. A data record sensing system according to claim 1 wherein the scanner signal generator is a radiant energy generator, and wherein the circuit means includes a radiant energy detector responsive to pulses produced by the scanner signal generator to convert such pulses into equivalent electrical pulses.

3. A data record sensing system according to claim 2 wherein the circuit means includes:
   a first differentiator connected to receive electrical pulses from said radiant energy detector and producing first control pulses from the leading edges of said electrical pulses,
   a second differentiator connected to receive electrical pulses from said radiant energy detector and producing second control pulses from the trailing edges of said electrical pulses,
   a first gate connected to be unblocked by a reference pulse so as to pass pulses from said pulse generator to a first pulse counter of said pulse counting means, said gate being connected to said first differentiator to be blocked by said first control pulse, and a second gate connected to be unblocked by a reference pulse so as to pass pulses from said pulse generator to a second pulse counter of said pulse counting means, said gate being connected to said second differentiator to be blocked by said second control pulse.

4. A data record sensing system according to claim 3 wherein the pulse counting means further includes data error correction means connected to selected outputs of said first and second counters, the said means being effective to compare outputs of said second pulse counter with outputs of said first pulse counter to determine error and to correct the outputs of the first counter in the event of error.

5. A data record sensing system according to claim 4 wherein said data error correction means comprises:
comparator means for comparing the outputs of said counters to generate comparison and no comparison signals;
correction means connected to receive the outputs of said first counter and to receive comparison signals from said comparator means to correct the outputs of said counter;
no change gating means connected to receive the outputs of said first counter and to receive no comparison signals from said comparator means to provide, as outputs, the raw outputs of said first counter; and
output gating means connected to receive outputs of said correction means and of said no change gating means to provide first counter outputs as an EXCLUSIVE OR function of the outputs of said correction means and said no change gating means.

6. A data record sensing system for retrieving data appearing as angularly related scanning marks on a record member and operative to convert such data into electrical signals useful for operating an output device, the system comprising:
scanning means for scanning said record member to produce output signals as a function of the angular relationship of said scanning marks, said scanning means including at least one photoelectric scanning head having a radiant energy generator to produce said output signals supported for rotation and a power means for rotatively driving said scanning head;
pulse generating means for producing pulses representing predetermined incremental angles of the maximum angular relationship within which said scanning marks may appear on said record member, said pulse generating means including a rotatively supported pulse generator for producing said pulses representing predetermined inclemental angles, said pulse generator being drivingly connected to said power means for rotation at the same speed as said scanning head;
detector means responsive to said output signals from said radiant energy generator for generating control pulses from said output signals;
pulse counting means; and
gating means responsive at least in part to said control signals for gating the pulses representing predetermined incrmental angles to said pulse counting means so that said pulse counting means provides an output which is an electrical equivalent of the angular relationship of the scanning marks.

7. A data record sensing system according to claim 6 wherein the pulse generating means further includes a second pulse generator for producing a gating means control pulse for each complete revolution of the scanning head; and wherein the gating means is responsive to said control pulse and to control pulses generated by the detector means.

8. A data record sensing system according to claim 7 wherein the counting means includes:
binary counting means responsive to said pulses representing predetermined incremental angles to provide on outputs of said means a raw electrical analogue of the data appearing on the record member, and
error checking and correction means connected to the outputs of said binary counting means for determining and correcting errors appearing in the outputs of said binary counting means.

9. A data record sensing system according to claim 8 wherein the binary counting means comprises at least two binary up counters; and wherein the error checking and correction means is connected to outputs of both counters and is effective to determine and correct errors appearing in the outputs of one of said binary up counters.

10. A data record sensing system according to claim 6 wherein the scanning means includes at least two photoelectric scanning heads supported for rotation and drivingly connected to said power means to be rotated at the same speed; and wherein said gating means is responsive solely to said control signals.

11. A data record sensing system according the claim 10 wherein the counting means includes:
binary counting means responsive to said pulses representing predetermined incremental angles to provide on outputs of said means a raw electrical annalogue of the data appearing on the record member; and
error checking and correction means connected to the outputs of said binary counting means for determining and correcting errors appearing in the outputs of said binary counting means.

12. A data record sensing system according to claim 11 wherein the binary counting means comprises at least two binary up counters; and wherein the error checking and correction means is connected to outputs of both counters and is effective to determine and correct errors appearing in the outputs of one of said binary up counters.

13. A data record sensing system operative to retrieve data relating to time, the data appearing on a record member as a first set of scanning marks angularly related in a circular format and as a second set of scanning marks angularly related in a circular format; the system being operative to convert such data into electrical signals, the system comprising:
scanning means having 1st and 2nd scanning heads supported for rotation for producing radiant energy pulses as functions of the angular relationships of the scanning marks in said first and second sets of scanning marks;
a rotatable source of pulses providing a constant number of pulses for each complete revolution of said scanning means;
power means for rotatably driving said scanning means and said source of pulses at the same rotational speed;
pulse counting means for providing electrical equivalents of the data appearing on said record members as outputs of the system; and, circuit means including detector means responsive to radiant energy pulses produced by said first and second scanning heads respectively for converting said pulses into equivalent electrical pulses, control pulse forming means operatively connected to said detector means to produce control pulses from the leading and trailing edges of said electrical pulses, and gating means connected to said control pulse forming means and responsive to control pulses produced from the leading edges of electrical pulses to gate pulses from said rotatable source of pulses into said pulse counting means, and being responsive to control pulses produced from the trailing edges of said electrical pulses to inhibit the passage of pulses from said rotatable source of pulses into said counting means, and for periodically resetting said pulse counting means.

14. A data record sensing system according to claim 13 wherein the data comprised by the first set of scanning marks is more significant than the data comprised by the second set of scanning marks; wherein the detector means, control pulse forming means and gating means comprise first and second circuits, responsive respectively to radiant energy pulses produced by the first and second scanning heads; and wherein the counting means includes first and second binary up counters connected to and controlled by said first and second circuits respectively to receive pulses from said rotatable source of pulses.

15. A data record sensing system in accordance with claim 14 wherein each control pulse forming means includes a first differentiator connected to a detector to produce control pulses from the leading edges of the electrical pulses, and a second differentiator connected to the detector through an inverter to produce control pulses from the trailing edges of the electrical pulses; and wherein each gating means includes a first latch connected to be set by control pulses produced by said first differentiator and operatively connected to open an output gate of said gating means to pass pulses from said rotatable source, and a second latch responsive to control pulses from said second differentiator and operatively connected to inhibit said output gate.

16. A data record sensing system according to claim 14 wherein the counting means further includes error checking and correction means connected to outputs of said first and second counters and responsive to said outputs for determining and correcting errors appearing in the outputs of the first of said counters.

17. A data record sensing system according to claim 16 wherein the error checking and correction means comprises:

comparator means for comparing the outputs of said counters to generate comparison and no comparison signals;

correction means connected to receive the outputs of said first counter and to receive comparison signals from said comparator means to correct the outputs of said counter;

no change gating means connected to receive the outputs of said first counter and to receive no comparison signals from said comparator means to provide, as outputs, the raw outputs of said first counter; and output gating means connected to receive outputs of said correction means and of said no change gating means to provide first counter outputs as an EXCLUSIVE OR function of the outputs of said correction means and said no change gating means.

* * * * *